(No Model.)

F. DOUGLAS.
PNEUMATIC BICYCLE TIRE.

No. 559,937. Patented May 12, 1896.

Witnesses:
Alex. Scott
D. W. Edelin

Inventor:
Frank Douglas

UNITED STATES PATENT OFFICE.

FRANK DOUGLAS, OF CHICAGO, ILLINOIS.

PNEUMATIC BICYCLE-TIRE.

SPECIFICATION forming part of Letters Patent No. 559,937, dated May 12, 1896.

Application filed September 28, 1895. Serial No. 564,056. (No model.)

*To all whom it may concern:*

Be it known that I, FRANK DOUGLAS, a citizen of the United States, residing at Chicago, county of Cook, State of Illinois, have invented certain new and useful Improvements in Pneumatic Tires for Bicycles, of which the following is a specification of the various modifications.

This invention relates to a tire with an inner inflatable tube to which a valve is attached and an outer casing composed of cloth and rubber which surrounds and protects the inner tube, so as to maintain the proper pressure for riding purposes. The outer casing is so constructed in its modifications that it can be opened all around its inner circumference where it enters the rim of the wheel for the purpose of putting in or repairing the inner tube or for repairing the casing on its inner surface. The casing is provided with projecting ears or lugs on either side of the opening, which project down into a single recess of the rim. These projecting lugs serve the double purpose of guide to hold the tire true on the wheel and also to hold it in place without the use of cement of any kind. They also assist to prevent the casing from spreading or opening when the inner tube is inflated.

In order to make the casing doubly safe and protect the rim from pressure on the lugs by inflation, I also provide fastenings in addition to the projecting lugs which enter the recess of the rim, which additional fastenings enable me to inflate the tire to a riding pressure, if desired, before it is inserted in the rim, thereby making the fastenings of the inner circumferential opening of the casing doubly safe from separation or from blowing out of the rim.

The accompanying drawings illustrate the methods and modifications for attaching the inner circumferential edges of the casing together after the insertion of the inner tube, and illustrate the ease with which they can be detached or opened up to get at the inner tube.

Figure 1:
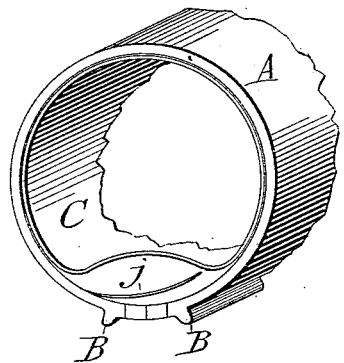
Figure 2:
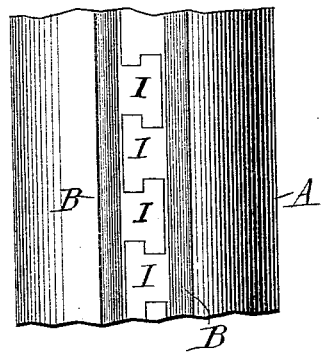
Figure 3:
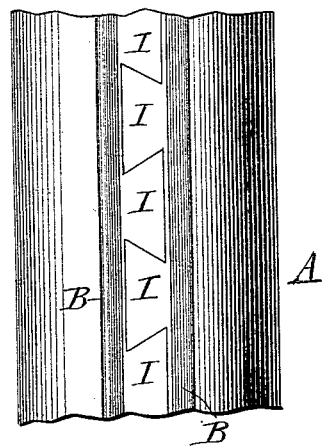

Figure 1 is a cross-section of the tire. A is the outer casing; C, the inner tube. B B are the two projecting lugs that serve as a guide in the recess of the rim. I are the dovetailed locks between the two lugs B B. *j* is a strip of rubber cloth that covers the dovetailed lock or opening. Fig. 2 is a longitudinal section of the casing with the lugs B B, showing a square form of dovetailing I I I for holding the two edges of the casing together between the lugs. Fig. 3 is a similar tire, showing another form of dovetail I I I.

I do not confine myself to any particular form or shape of dovetail or lock, as various shapes, either rounded, square, or angular, serve the same purpose when one portion of the stiffened edge of the casing is passed through the opening corresponding to its shape on the other stiffened edge of the casing, so as to lock it or dovetail it together and to prevent it spreading apart under pressure.

The object of my invention is to provide and place upon the market a pneumatic tire that can be used satisfactorily in a wood rim of a bicycle without the use of cement to hold it in its place, and also to so construct a tire as to make one edge of the casing attach to the other, so as to form a continuous circular tube before it is attached to or placed in the rim of a wheel, and also so fasten one edge of the casing to the other that it will stand the inflation of the inner tube, and thereby take the inflating strain largely off the lugs where they project into the recess of the rim, and also to so attach the edges of the casing that they may be deflated and opened up at will to get at any part of the inner portion of the casing or the inner tube, and, when desired, that the casing may be attached together again the same as it was before opening it up and inflated without the use of any other means for attaching the edges together.

In order to make the locking device sustain the necessary pressure, the portion between the lugs B B is made preferably of stiffened cloth and rubber of sufficient thickness for the purpose.

I am aware that a clencher form of tire has been used where the great force of inflation acted upon the clenching portion into the hooked edge of the rim to prevent the tire from separating under the inflating strain, and with the metallic rim the strength is sufficient to prevent such separation. In my invention I do not use the projecting lugs for the purpose of preventing separation of the casing, but as a guide to hold the casing in its true line in the rim and to save the use of cement to hold the casing in its place.

I am also aware that an attempt has been made to fasten the edges of the casing together by continuous projections on one side to overlap the other, but without the use of any buttoning or dovetailing device, where dovetails or buttons on one side passed through corresponding openings on the other side between the two guiding-lugs to hold the tire true in the rim. Therefore it was found that the lap portion would not stay hooked over the projections of the other side under pressure and would blow out of the rim, making them valueless as a fastening device. In my invention I guide and hold the tire true in its place in the rim by the lugs B B, which fit the recess of the rim, and, when inflated, bind the tire so tightly in the rim as to prevent creeping or rolling, and therefore no cement is required.

The principal object of my invention is to make a tire-casing in such a manner as to easily lock it together before placing it in the rim or when taken out of the rim unlock it, so as to get at the inner tube.

Another important object of my invention is to so make the outer casing of a tire that the locking device which holds the two edges of the casing together will not have a tendency to split the wood rim of a wheel, but will sustain its own inflation without strain upon the rim, as would be the case in the clencher-tire.

The edges of the tire, as shown in Figs. 2 and 3, may be molded in the form of dovetails or buttons when molded with the stiffened fabric and rubber and cut in such form as to lock together, either button-shaped or dovetail. The joints of the dovetail may be covered by the lap of cloth $j$.

Having thus described the nature and object of my invention, what I claim as new, and desire to secure by Letters Patent, is—

A bicycle-tire casing composed of cloth and rubber, opened between the two continuous projecting lugs or beads which are molded of the material composing the casing, with the space between the lugs and edges thickened and stiffened and cut or molded into interlocking buttons or dovetails between the two projecting beads when used in combination with a wheel-rim, provided with central grooves to receive the beads, substantially as herein described.

FRANK DOUGLAS.

Witnesses:
J. LOEB,
C. A. PATTERSON.